(12) United States Patent
Watanabe et al.

(10) Patent No.: US 9,001,175 B2
(45) Date of Patent: Apr. 7, 2015

(54) OPTICAL SCANNING DEVICE AND METHOD FOR OPERATING THE SAME AND IMAGE FORMING APPARATUS

(71) Applicants: Takao Watanabe, Kanagawa (JP); Shinji Kobayashi, Tokyo (JP); Yasuhiro Izawa, Hyogo (JP)

(72) Inventors: Takao Watanabe, Kanagawa (JP); Shinji Kobayashi, Tokyo (JP); Yasuhiro Izawa, Hyogo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/022,331

(22) Filed: Sep. 10, 2013

(65) Prior Publication Data

US 2014/0078563 A1    Mar. 20, 2014

(30) Foreign Application Priority Data

Sep. 11, 2012    (JP) ................................. 2012-199856

(51) Int. Cl.
    *B41J 2/435*    (2006.01)
    *B41J 2/47*    (2006.01)
    *H04N 1/029*    (2006.01)

(52) U.S. Cl.
    CPC .................................... *H04N 1/029* (2013.01)

(58) Field of Classification Search
    USPC .................. 347/225, 237, 240, 247, 251–254
    See application file for complete search history.

(56) References Cited

U.S. PATENT DOCUMENTS

2010/0214626 A1 *   8/2010   Tsuchiya et al. .............. 358/461
2011/0102873 A1     5/2011   Wada

FOREIGN PATENT DOCUMENTS

JP    2011-098494    5/2011
JP    2013-147021    8/2011

* cited by examiner

*Primary Examiner* — Hai C Pham
(74) *Attorney, Agent, or Firm* — Harness, Dickey & Pierce, P.L.C.

(57) ABSTRACT

An optical scanning device comprising: a light source that emits a laser beam; and a driving unit connected to the light source and configured to drive the light source; the driving unit comprising: a first storage unit that stores in advance therein a setting value for controlling output of the laser beam; a second storage unit that stores temporally therein the setting value stored in the first storage unit; a storage controller connected to the first storage unit and the second storage unit; and a voltage detector connected to the storage controller and configured to detect a voltage value supplied to the driving unit, wherein the storage controller, upon the voltage detector detecting that the voltage supply is resumed, transfers the setting value stored in the first storage unit to the second storage unit automatically.

6 Claims, 8 Drawing Sheets

FIG.10B

OPTICAL SCANNING DEVICE AND METHOD FOR OPERATING THE SAME AND IMAGE FORMING APPARATUS

CROSS-REFERENCE TO RELATED APPLICATIONS

The present application claims priority to and incorporates by reference the entire contents of Japanese Patent Application No. 2012-199856 filed in Japan on Sep. 11, 2012.

BACKGROUND

1. Field of the Invention

Example embodiments relate to an optical scanning device and an image forming apparatus.

2. Description of the Related Art

Conventionally, a semiconductor laser is used to expose photoreceptors in an image forming apparatus. To control the semiconductor laser, a light-intensity adjustment value is stored in a memory and a control unit that controls the semiconductor laser adjusts the intensity of emitted light based on the adjustment value stored in the memory. For example, Japanese Patent Application Laid-open No. 2011-98494 discloses an image forming apparatus, in which a gain adjustment value and a bias adjustment value used for feedback control on the semiconductor laser are stored in a nonvolatile memory and an integrated circuit performs the feedback control by using the stored setting values. The data stored in the nonvolatile memory is stored into a register corresponding to the integrated circuit, and each integrated circuit drives the semiconductor laser based on the control information stored in the corresponding register.

However, in the above-described system in which the control data stored in the nonvolatile memory is stored into the register, if an image forming apparatus is opened to remove a sheet of paper jammed in the image forming apparatus or if the image forming apparatus enters a power saving mode, power supply to the integrated circuit that drives the semiconductor laser is interrupted. Therefore, when the power supply is resumed, it is necessary to store the data again from the nonvolatile memory to the register, which makes it difficult to promptly resume the operation.

Therefore, there is a need for an optical scanning device capable of simplifying a process for causing a control unit of a light source to resume from a power-off state when a setting value for controlling the light source is stored in a nonvolatile memory.

SUMMARY

It is an object of example embodiments to at least partially solve the problems in the conventional technology.

According to an aspect of example embodiments, an optical scanning device including: a light source that emits a laser beam; and a driving unit connected to the light source and configured to drive the light source is provided. The driving unit includes: a first storage unit that stores in advance therein a setting value for controlling output of the laser beam; a second storage unit that stores temporally therein the setting value stored in the first storage unit; a storage controller connected to the first storage unit and the second storage unit; and a voltage detector connected to the storage controller and configured to detect a voltage value supplied to the driving unit, wherein the storage controller, upon the voltage detector detecting that the voltage supply is resumed, transfers the setting value stored in the first storage unit to the second storage unit automatically.

According to another aspect of example embodiments, a method for operating an optical scanning device is provided. The optical scanning device includes: a light source that emits a laser beam; and a driving unit connected to the light source and configured to drive the light source. The driving unit includes: a first storage unit that stores in advance therein a setting value for controlling output of the laser beam; a second storage unit that stores temporally therein the setting value stored in the first storage unit; a storage controller connected to the first storage unit and the second storage unit; and a voltage detector connected to the storage controller and configured to detect a voltage value supplied to the driving unit. The method includes: by the voltage detector, detecting that the voltage supply is resumed; and by the storage controller, upon the detection, automatically transferring the setting value stored in the first storage unit to the second storage unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE EXAMPLE EMBODIMENTS

First Embodiment

Figure 1:
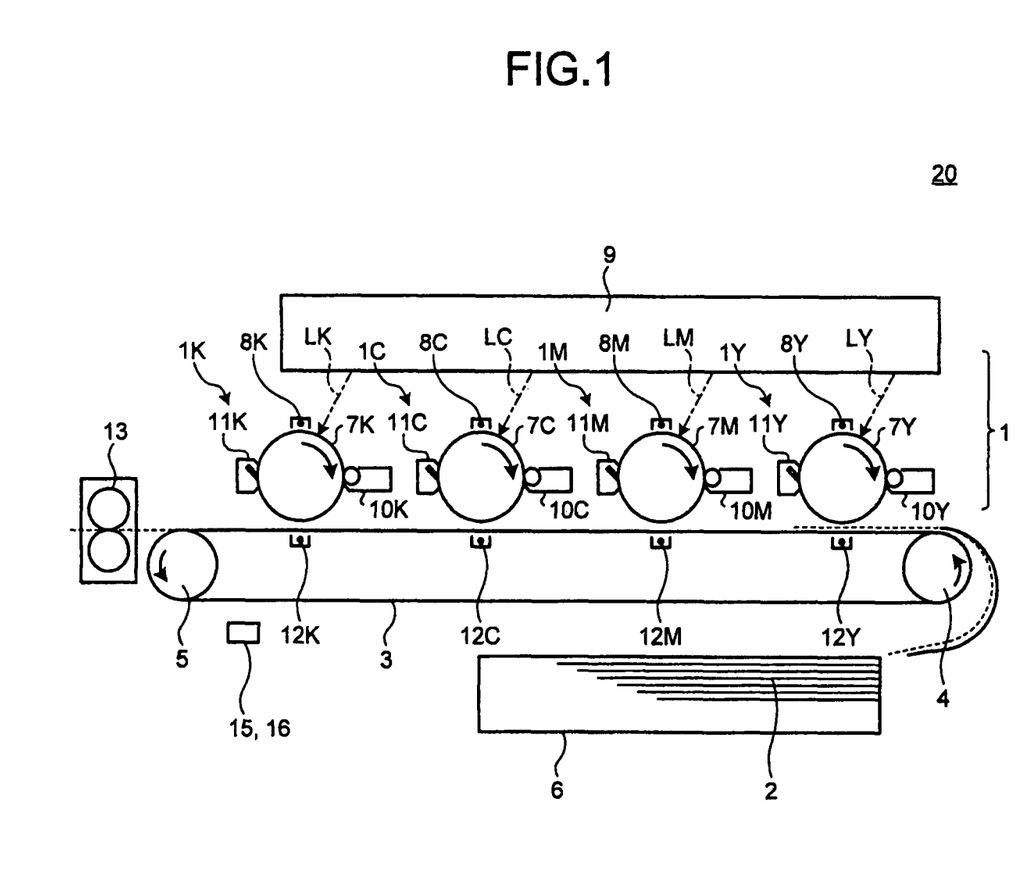
FIG. 1 is a schematic diagram illustrating a configuration example of main components of a color copier serving as an image forming apparatus according to an example embodiment.

Exemplary embodiments of the present invention will be explained in detail below with reference to the accompanying drawings. FIG. 1 illustrates a configuration example of main components of a color copier 20 serving as an image forming apparatus to which an embodiment of the present invention is applicable. The color copier 20 includes an image process unit, an exposing unit 9 including an optical scanning unit, and a transmission belt, and forms an image on a sheet of paper through electrophotographic image formation.

The color copier 20 is a tandem type, in which four image forming units 1Y, 1M, 1C, and 1K that form images of respective colors of Y (Yellow), M (Magenta), C (Cyan), and K (Black) inside an image process unit 1 are arranged in a line along a transfer belt 3 that conveys a sheet of paper serving as a transfer medium.

The transfer belt 3 is extended between a driving roller 4 that rotates and a driven roller 5 that is rotated, and is rotated in the direction of arrows in FIG. 1 along with the rotation of the driving roller 4. A sheet feed tray 6, in which sheets of paper are stored, is provided below the transfer belt 3. When an image is to be formed, a topmost sheet of paper among the sheets of paper stored in the sheet feed tray 6 is fed toward the transfer belt 3 and is adsorbed on the transfer belt 3 by electrostatic adsorption. The adsorbed sheet of paper is conveyed to the image forming unit 1Y, where an image of Y color is first formed.

The image forming units 1Y, 1M, 1C, and 1K include photosensitive drums (photoreceptors) 7Y, 7M, 7C, and 7K and include charging units 8Y, 8M, 8C, and 8K, developing units 10Y, 10M, 10C, and 10K, photoreceptor cleaners 11Y, 11M, 11C, and 11K, and transfer units 12Y, 12M, 12C, and 12K, which are arranged around the photosensitive drums 7Y, 7M, 7C, and 7K, respectively.

For example, the surface of the photosensitive drum 7Y of the image forming unit 1Y is uniformly charged by the charging unit 8Y and thereafter exposed by a laser beam LY corresponding to an image of Y color by the exposing unit 9, so that an electrostatic latent image is formed. The developing unit 10Y develops the formed electrostatic latent image, so that a toner image is formed on the photosensitive drum 7Y rotating at a predetermined speed. The transfer unit 12Y transfers the toner image to a sheet of paper at a position (transfer position) where the photosensitive drum 7Y and the sheet of paper on the transfer belt 3 come into contact with each other. Accordingly, an image of a single color (Y color) is formed on the sheet of paper. The photoreceptor cleaner 11Y cleans waste toner remaining on the surface of the photosensitive drum 7Y after completion of the transfer, so that preparation for next image formation is ready.

The sheet of paper on which the toner image of a single color (Y color) is transferred by the image forming unit 1Y as described above is conveyed to the image forming unit 1M by the transfer belt 3. Similarly to the above, a toner image of M color formed on the photosensitive drum 7M is transferred to the sheet of paper in a superimposed manner. Thereafter, the sheet of paper is sequentially transferred to the image forming units 1C and 1K, where toner images of C color and K color are transferred to the sheet of paper. Consequently, a color image is formed on the sheet of paper.

The sheet of paper on which the color image is formed by passing through the image forming unit 1K is separated from the transfer belt 3, subjected to image fixation by a fixing unit 13, and discharged.

Reflective detection sensor devices 15 and 16 are provided with a mounting distance L so as to correspond to both ends of a conveying belt 2 in the main-scanning direction. The detection sensor devices 15 and 16 are used to detect toner patch rows and toner mark rows of the respective colors formed on the conveying belt 2, to align the positions of all of the colors, and to control image density.

Figure 2:
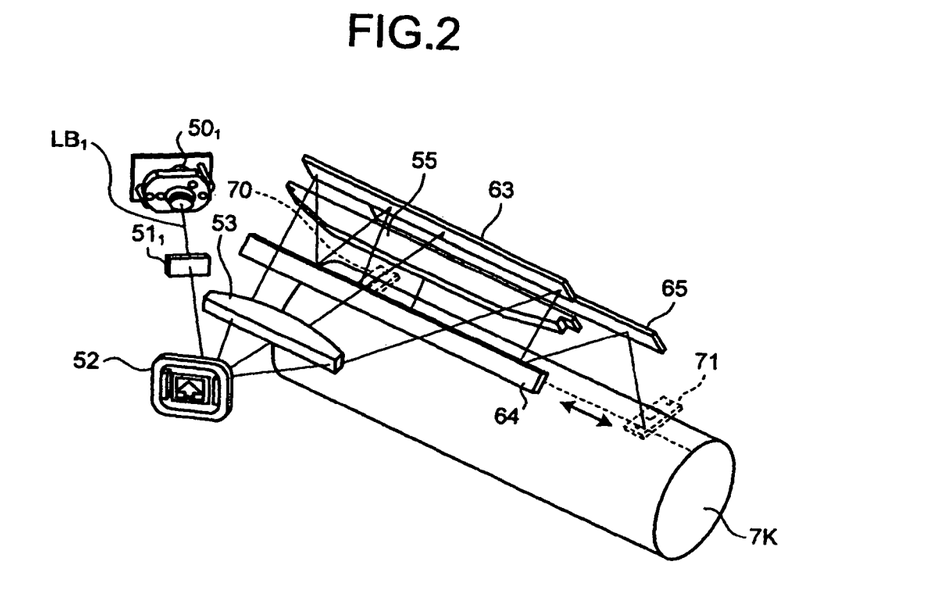
FIG. 2 is a perspective view illustrating a configuration example of an optical scanning device according to an example embodiment.

FIG. 2 is a perspective view illustrating a configuration example of an optical scanning device of the color copier 20 illustrated in FIG. 1. FIG. 2 illustrates an example in which one oscillating mirror is used to scan one photosensitive drum. Incidentally, FIG. 2 illustrates only a configuration related to the photosensitive drum 7K.

Each of light beams included in light beam $LB_1$ emitted by a light source unit $50_1$ (light source) using a laser diode as a light source is shaped only in the sub-scanning direction by a cylindrical lens $51_1$ with refractive power only in the sub-scanning direction, so that a latent image elongated in the main-scanning direction is formed on an oscillating mirror 52 by a micro-electro-mechanical systems (MEMS). It may be possible to form the latent image by a polygon-mirror scanning optical system instead of the MEMS.

The light beam $LB_1$ incident on the oscillating mirror 52 is deflected for scanning by the oscillating mirror 52 and is applied to the photosensitive drum 7K via a subsequent imaging optical system including a scanning lens 53 on the oscillating mirror 52 side, a scanning lens 55 on the scanning-surface side, and reflecting mirrors 63, 64, and 65. By oscillating the oscillating mirror 52 in the main-scanning direction while emitting the light beam $LB_1$, an image is formed on the surface of the photosensitive drum 7K serving as one scanning surface by reciprocating scanning in the direction parallel to the rotation axis of the photosensitive drum 7K as indicated by an arrow in the figure.

A front-end synchronous detection sensor 70 and a rear-end synchronous detection sensor 71 detect light beams reflected from the oscillating mirror 52 and output detection signals. With the detection signals, it is possible to detect a front end and a rear end of the scanning. In the example illustrated in FIG. 2, the front-end synchronous detection sensor 70 and the rear-end synchronous detection sensor 71 are arranged between the reflecting mirror 65 and the photosensitive drums 7K.

Figure 3:
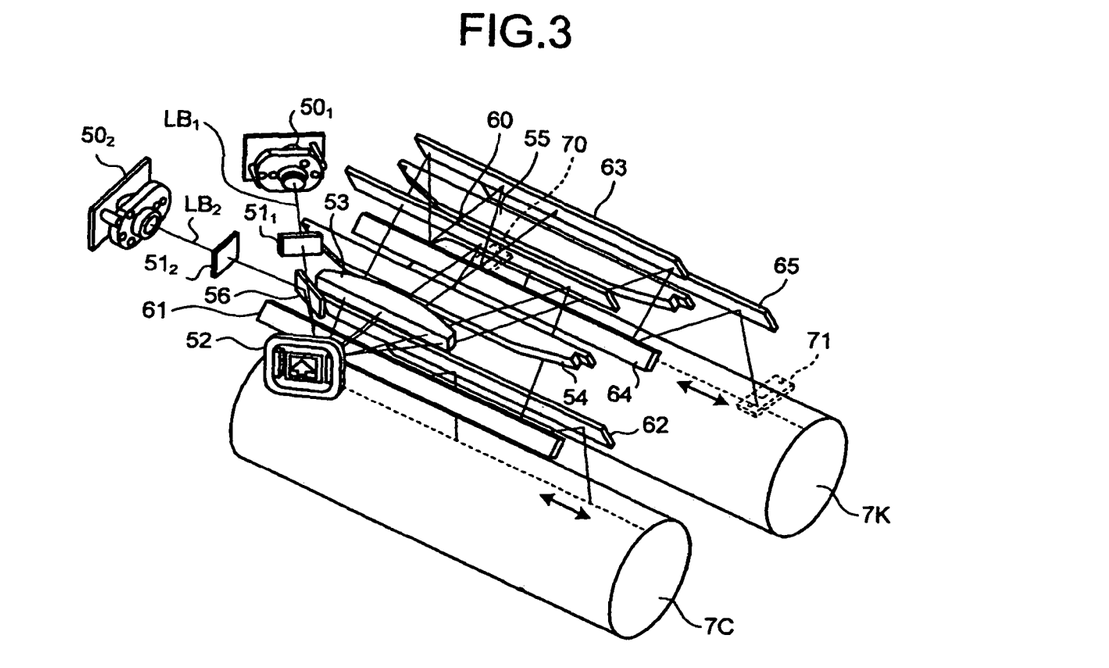
FIG. 3 is a perspective view illustrating another configuration example of the optical scanning device according to an example embodiment.

FIG. 3 is a perspective view illustrating another configuration example of the optical scanning unit. FIG. 3 illustrates an example in which one oscillating mirror is used to scan two photosensitive drums. Incidentally, FIG. 3 illustrates only configurations related to the photosensitive drums 7K and 7C. In addition, in FIG. 3, the same components as those illustrated in FIG. 2 are denoted by the same reference numerals and symbols, and detailed explanation thereof will be omitted.

In FIG. 3, a light source unit $50_2$, a cylindrical lens $51_2$, a half mirror 56, and reflecting mirrors 60, 61, and 62 are added to the configuration illustrated in FIG. 2. The light beam $LB_1$ emitted by the light source unit $50_1$ transmits through the half mirror 56 and reaches the oscillating mirror 52. The subsequent optical path of the light beam $LB_1$ is the same as the optical path illustrated in the example of FIG. 2 described above, and therefore, explanation thereof will be omitted.

A light beam $LB_2$ emitted by the light source unit $50_2$ is reflected from the half mirror 56, reaches the oscillating mirror 52, is deflected for scanning by the oscillating mirror 52, and is applied to the photosensitive drum 7C via the subsequent imaging optical system including the scanning lens 53 on the oscillating mirror 52 side, a scanning lens 54 on the scanning-surface side, and the reflecting mirrors 60, 61, and 62. By oscillating the oscillating mirror 52 in the main-scanning direction while emitting the light beams $LB_1$ and $LB_2$, images are formed on the respective surfaces of the photosensitive drums 7K and 7C serving as the scanning surfaces by reciprocating scanning in the direction parallel to the rotation axes of the photosensitive drums 7K and 7C.

In the following, it is assumed that the optical scanning device is configured as illustrated in FIG. 2, in which one oscillating mirror is used to scan one photosensitive drum. In the above explanation, each of the light source units 50$_1$ and 50$_2$ is illustrated as a one-channel light source. However, in actuality, a multi-channel light source, for example, ten-channel light source is used as each of the light source units 50$_1$ and 50$_2$.

In the following, the oscillating mirror 52 is explained as a representative example of the oscillating mirrors corresponding to the photosensitive drums 7Y, 7M, 7C, and 7K unless otherwise specified. Similarly, photosensitive drum 7 is explained as a representative example of the photosensitive drums 7Y, 7M, 7C, and 7K unless otherwise specified. In addition, although not illustrated in the figures, a photodiode (hereinafter, described as a "PD") serving as a light-receiving element receives the light emitted by the light source unit 50$_1$ and reflected from each of the mirrors, and the PD outputs an analog voltage signal that is obtained by converting a monitored current proportional to the intensity of the received laser beam into a voltage.

Figure 4:
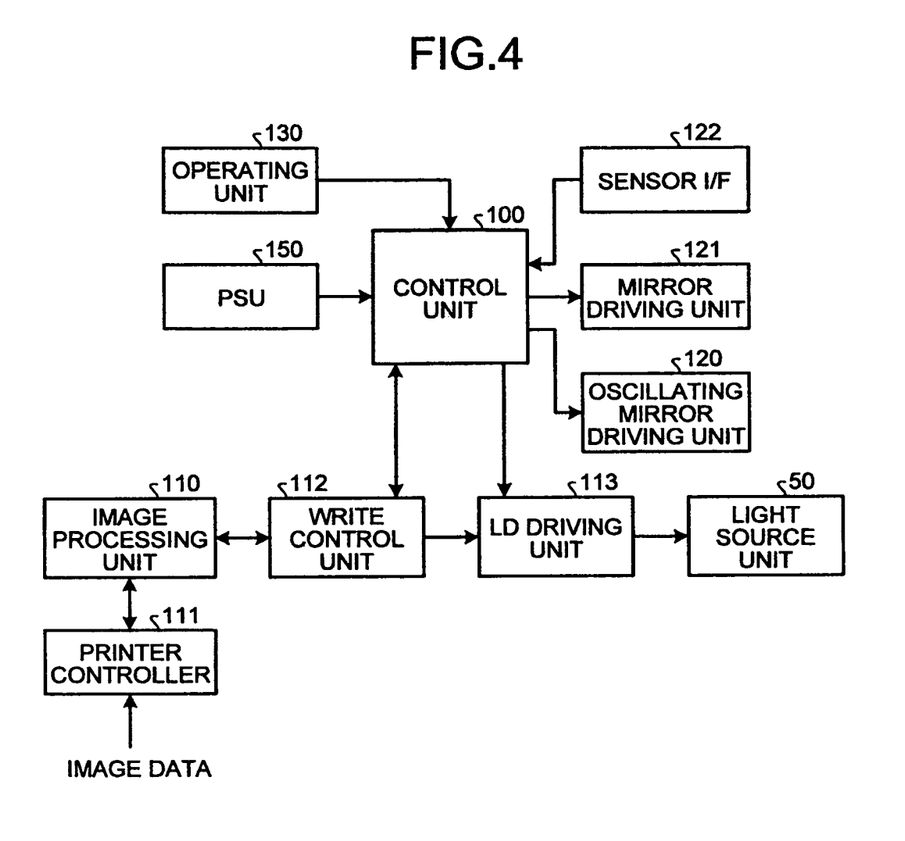
FIG. 4 is a block diagram schematically illustrating an example of a configuration for controlling the optical scanning device according to an example embodiment.

FIG. 4 schematically illustrates an example of a configuration for controlling the optical scanning device. A control unit 100 includes, for example, a central processing unit (CPU), a read only memory (ROM), and a random access memory (RAM), and controls an optical scanning unit and a write control unit 112 to be described later, according to a program pre-stored in the ROM by using the RAM as a working memory. An operating unit 130 receives user operation. For example, the operating unit 130 outputs a control signal corresponding to user operation for selecting whether to perform full-color printing using all of the colors Y, M, C, and K or monochrome printing using only the color K, and sends the signal to the control unit 100.

A printer controller 111 receives, for example, image data transmitted from a personal computer (PC) via a network. The printer controller 111 transfers the received image data to an image processing unit 110. The image processing unit 110 performs, on the image data received from the printer controller 111, various types of image processing according to the image data.

The image processing unit 110 receives sub-scanning timing signals of the respective colors K, M, C, and Y transmitted by the write control unit 112, transmits main-scanning gate signals and sub-scanning gate signals of the respective colors to the write control unit 112, and transmits pieces of image data of the respective colors according to the synchronization signals to the write control unit 112.

The write control unit 112 performs predetermined write processing on the received pieces of image data of the respective colors under the control of the control unit 100 to thereby generate pieces of image data to be written, and transmits the pieces of image data to a laser-diode (LD) driving unit 113 (light source control unit) that controls a light source unit 50 for emitting light beams to write the colors Y, M, C, and K.

The LD driving unit 113 drives the light source unit 50. In the example of FIG. 4, the light source unit 50 is illustrated as a representative example of LDs for the respective colors Y, M, C, and K. The LD driving unit 113 is arranged in the exposing unit 9, and controls application of laser beams LK, LM, LC, and LY by the exposing unit 9 to the photosensitive drums 7K, 7M, 7C, and 7Y. By applying the laser beams LK, LM, LC, and LY to the photosensitive drums 7K, 7M, 7C, and 7Y, toner images are formed on the respective photosensitive drums 7K, 7M, 7C, and 7Y. The toner images formed as above are transferred and output to a sheet of paper.

An oscillating mirror driving unit 120, a mirror driving unit 121, and a sensor I/F 122 are connected to the control unit 100. The oscillating mirror driving unit 120 drives the oscillating mirror 52 under the control of the control unit 100. The mirror driving unit 121 controls an angle adjustment mechanism (to be described in detail later) that adjusts an angle of a mirror used to change the optical path from the oscillating mirror 52 to the photosensitive drum 7K under the control of the control unit 100. The sensor I/F 122 is an interface for inputting output signals from the front-end synchronous detection sensor 70 and the rear-end synchronous detection sensor 71 to the control unit 100.

A power supplying unit (PSU) 150 is connected to the control unit 100. Electrical power supplied by a power source unit of the PSU 150 is supplied to each of the units via the control unit 100.

Figure 5:
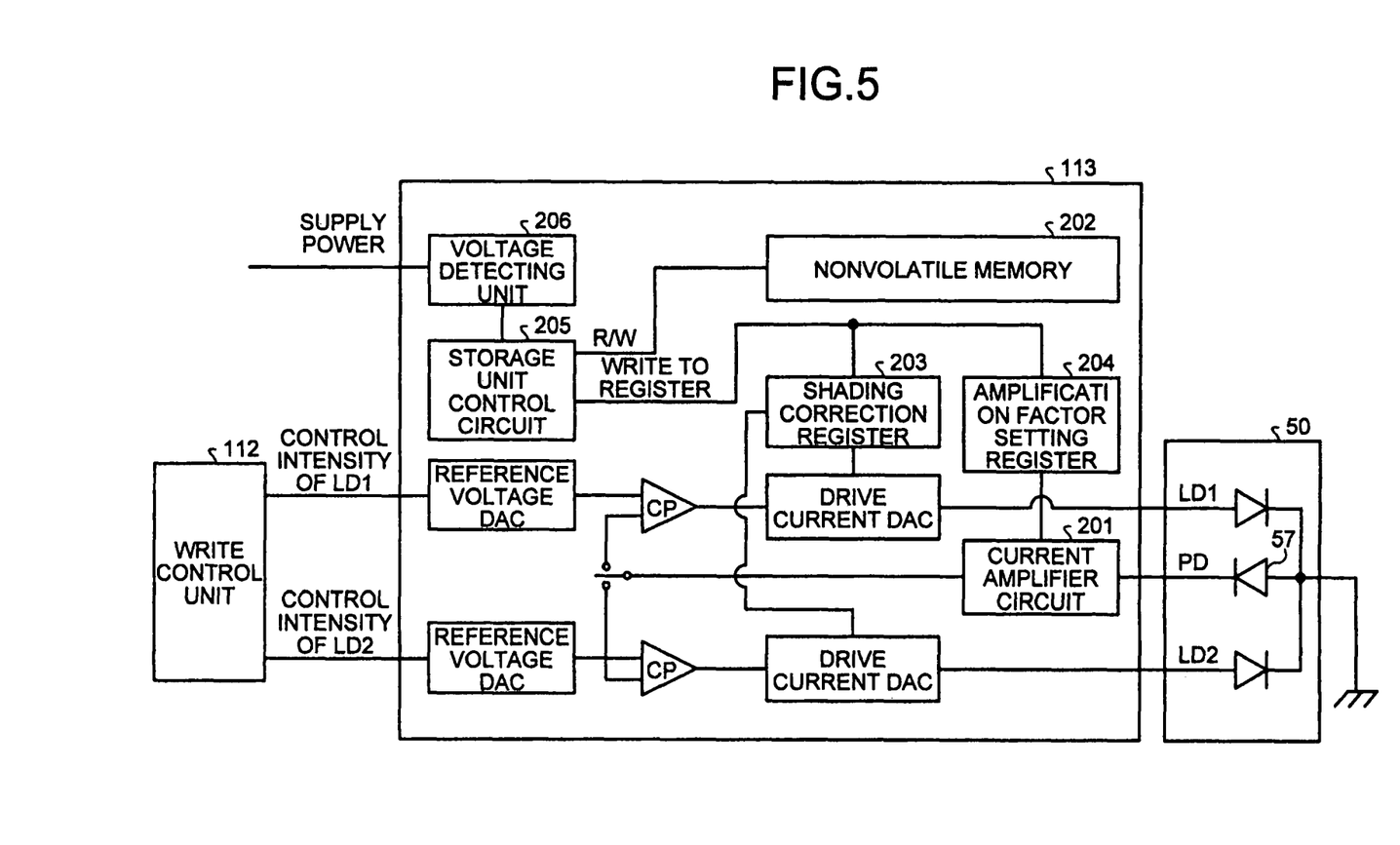
FIG. 5 is a diagram illustrating a circuit configuration of an LD driving unit according to an example embodiment.

FIG. 5 is a diagram illustrating a detailed configuration of the LD driving unit 113. The LD driving unit 113 includes a current amplifier circuit 201, a nonvolatile memory 202, a shading correction register 203, an amplification factor setting register 204, a storage unit control circuit 205, and a voltage detecting unit 206. A PD 57 built in the light source unit 50 of a controlled object outputs a monitored current that varies according to the intensity of received light to the LD driving unit 113. The LD driving unit 113 performs digital-to-analog conversion on the input monitored current, and the current amplifier circuit 201 digitally control the amount of current based on a setting value that is used to adjust the light intensity and that is stored in the amplification factor setting register 204 serving as a storage unit. An amplification factor of the current is determined based on the setting value stored in the amplification factor setting register 204. When the setting value on the amplification factor of the current is not stored in the amplification factor setting register 204, the amplification factor is determined by comparing a reference voltage, generated by a reference voltage generating circuit of the LD driving unit 113 with a value obtained by performing current-to-voltage conversion on the monitored current, and the determined value is stored in the amplification factor setting register 204.

Figure 6:
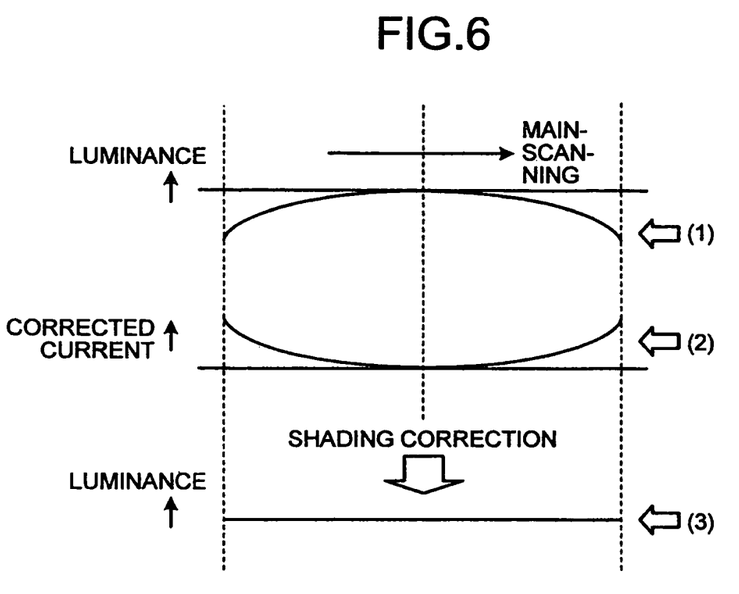
FIG. 6 is a diagram for explaining shading characteristics of a light source unit according to an example embodiment.

The shading correction register 203 stores therein a shading correction value corresponding to the shading characteristics of the light source unit 50. In the light source unit 50, as indicated by an arrow (1) in FIG. 6, the luminance of the light source unit 50 is not uniform in the main-scanning direction. Therefore, to correct the unevenness, as indicated by an arrow (2), a shading correction value for correcting the amount of the current is set such that a current corresponding to the shading characteristics can be applied, in particular, such that a current with higher intensity is applied to an area with relatively low luminance and a current with lower intensity is applied to an area with relatively high luminance. Thereafter, the finally-corrected current flows through the light source unit 50, so that the luminance in the main-scanning direction becomes substantially constant as indicated by an arrow (3). Incidentally, the PSU 150 supplies power to each of the registers 203 and 204 via the control unit 100, and the setting value can be stored in the registers 203 and 204 while the power is supplied. Therefore, the setting value is reset when the power is not supplied.

The nonvolatile memory 202 stores therein the same value as the setting value stored in the amplification factor setting register 204 and the shading correction register 203 as described above. A timing to store the setting value can be set arbitrarily. For example, it may be possible to set the same setting value in the nonvolatile memory 202 when a new setting value is stored in each of the registers 203 and 204. The storage unit control circuit 205 performs a process for writing a setting value stored in the nonvolatile memory 202 into the corresponding register 203 or 204 when the voltage detecting unit 206 detects that the power supply is resumed. The storage unit control circuit 205 is configured as an electronic circuit that automatically transfers data upon detection of a voltage even without an instruction from the CPU of the control unit 100.

Figure 7:
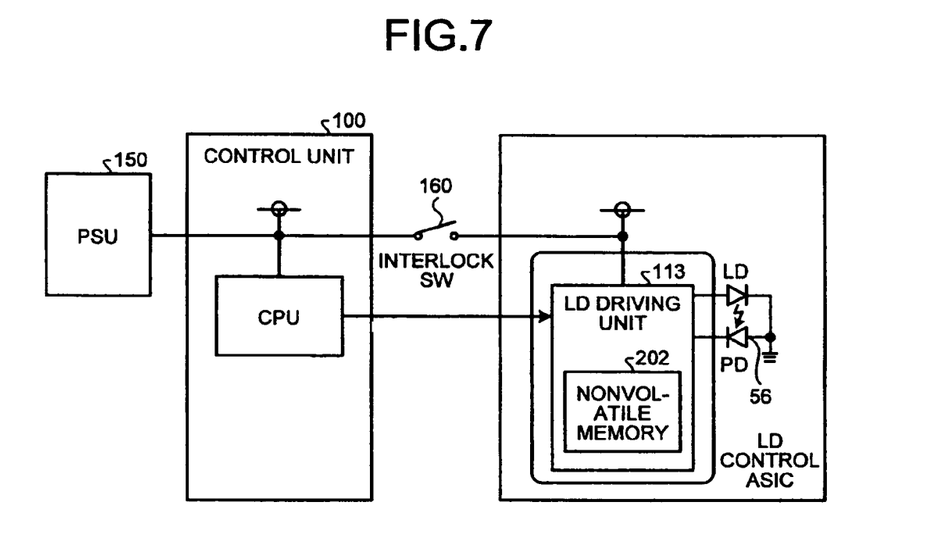
FIG. 7 is a diagram illustrating a configuration of a circuit related to power supply to the LD driving unit according to an example embodiment.

FIG. 7 is a block diagram illustrating a configuration related to the power supply to the LD driving unit 113. As illustrated in FIG. 7, an interlock switch (SW) 160 is arranged between the control unit 100 and the LD driving unit 113. The interlock switch 160 operates in conjunction with open/close operation of a cover or a door of the image forming apparatus such that contacts of the switch are off when the cover or the door is opened and power supply to the LD driving unit 113 is interrupted. The cover or the door is opened when, for example, a printing paper is jammed in a conveying path in the apparatus. Therefore, the above configuration enables to protect a user from exposure to radiation from the light source unit 50 when the user removes the paper to recover a failure.

Figure 8:
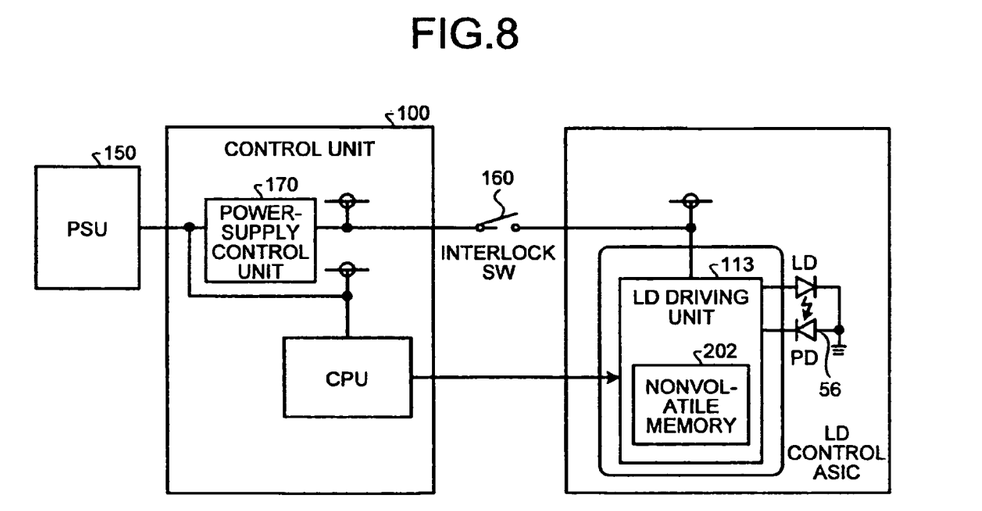
FIG. 8 is a diagram illustrating another configuration of the circuit related to power supply to the LD driving unit according to an example embodiment.

FIG. 8 is a block diagram illustrating another configuration related to the power supply to the LD driving unit 113. In FIG. 8, a power-supply control unit 170 is added. For example, the power-supply control unit 170 operates in a power saving mode that is active when the color copier 20 has not been operated for a predetermined time, and stops unneeded power supply to the LD driving unit 113. In this case, even in the power saving mode, the power supply to the LD driving unit 113 is stopped and the setting values stored in the registers 203 and 204 are reset.

As described above, if the power supply to the LD driving unit 113 is stopped because the power saving mode is activated or the door is opened, the setting values stored in the registers 203 and 204 are reset. In this case, no setting value is stored in the registers 203 and 204 even when the power supply is resumed, and, if a new setting value is calculated by performing feedback control by the light source unit 50, a processing load increases. Therefore, in the embodiment, if the voltage detecting unit 206 detects that the power is resumed, the storage unit control circuit 205 automatically stores the setting value that has been stored in the nonvolatile memory 202 into the registers 203 and 204. A detailed flow of this process will be explained below.

Figure 9A:
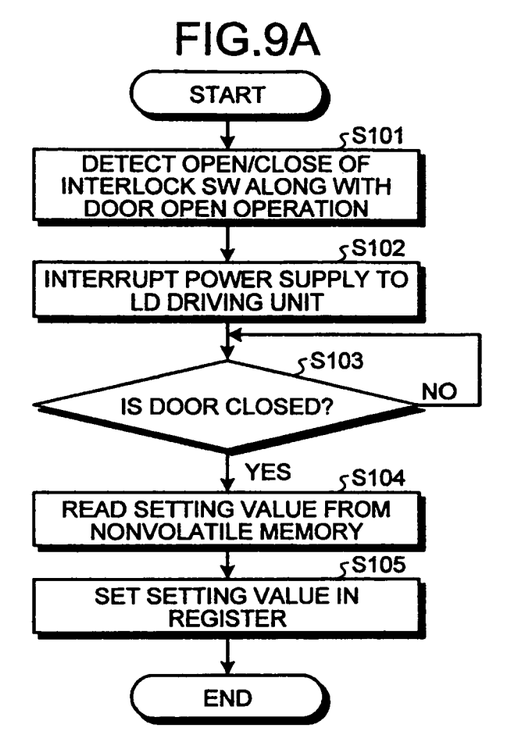
FIGS. 9A and 9B are flow diagrams illustrating the flow of a process performed by an LD activating unit for resuming from a door open state according to an example embodiment.
Figure 9B:
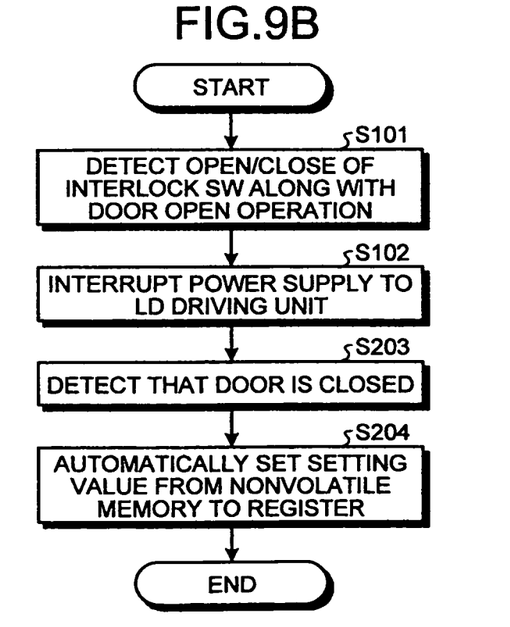

FIG. 9A illustrates the flow of a normal process performed by the CPU of the control unit 100 when the power supply is resumed. FIG. 9B illustrates the flow of a process performed by the storage unit control circuit 205 when the power supply is resumed. When the door of the color copier 20 is opened and the open/close state of an interlock switch (SW) driven by an actuator connected to the door is detected (Step S101), the interlock switch 160 is turned off and the power supply to the LD driving unit 113 is interrupted (Step S102). The control unit 100 enters a standby state until the door is closed again (No at Step S103). Incidentally, the voltage detecting unit 206 of the LD driving unit 113 detects that the door is closed according to a change in the voltage, while the LD driving unit 113 is not in the standby state because electrical power is not supplied to the LD driving unit 113 (Step S203).

When the door is closed, the CPU of the control unit 100 reads a setting value from the nonvolatile memory (Step S104), and sets the read setting value in the corresponding register 203 or 204 (Step S105). On the other hand, in the LD driving unit 113 according to the embodiment, the storage unit control circuit 205 automatically sets a setting value that has been stored in the nonvolatile memory 202 into the corresponding register 203 or 204 without via the CPU (Step S204).

Figure 10A:
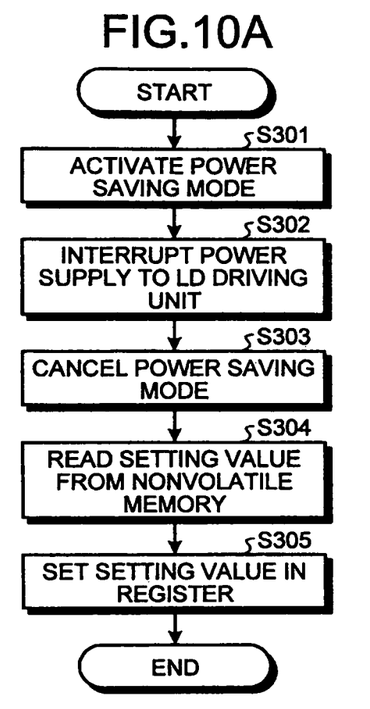
FIGS. 10A and 10B are flow diagrams illustrating the flow of a process performed by the LD activating unit for resuming from a power saving mode according to an example embodiment.
Figure 10B:
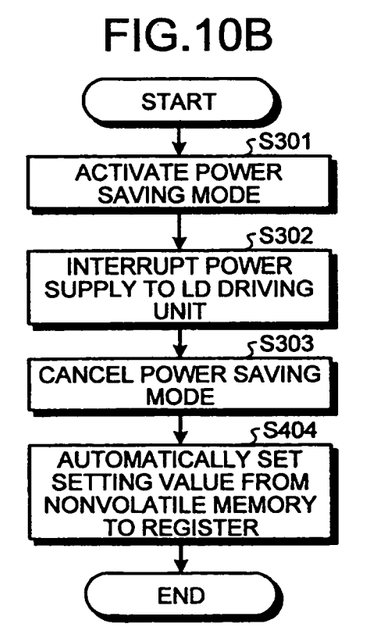

A process for re-setting the shading correction value will be explained below with reference to FIGS. 10A and 10B. FIG. 10A illustrates the flow of a normal process performed by the CPU of the control unit 100 when the power supply is resumed. FIG. 10B illustrates the flow of a process performed by the storage unit control circuit 205 of the embodiment when the power supply is resumed. The power-supply control unit 170 performs a control process to activate the power saving mode (Step S301), so that the power supply to the LD driving unit 113 is interrupted (Step S302). In this state, if any operation is performed on the color copier 20, the color copier is resumed from the power saving mode and the power-supply control unit 170 cancels the power saving mode to resume the power supply to the LD driving unit 113 (Step S303).

Subsequently, when the color copier is resumed from the power saving mode, the CPU of the control unit 100 reads a setting value from the nonvolatile memory 202 (Step S304), and sets the read setting value in the corresponding register 203 or 204 (Step S305). On the other hand, in the LD driving unit 113 according to the embodiment, the storage unit control circuit 205 automatically sets the setting value that has been stored in the nonvolatile memory 202 into the corresponding register 203 or 204 (Step S404).

According to the image forming apparatus of the embodiment as described above, when the apparatus is resumed from the power saving mode or the door open state, the storage unit control circuit 205 provided in the LD driving unit 113 re-sets the setting value that has been stored in the nonvolatile memory 202 into the register 203 or 204 without via the CPU. Therefore, the process can be simplified and the time taken to the control process can be shortened.

Furthermore, not only the setting value used to determine an amplification factor of a current but also the shading correction value are automatically re-set on resume. Therefore, it becomes not necessary to newly set the shading correction value, which needs to be a different value at each main-scanning position and which makes the control process more complicated, and it becomes possible to automatically re-set the value to the value stored in the nonvolatile memory 202.

According to one embodiment of the present invention, when a setting value used to control the light source is stored in a nonvolatile memory, it is possible to simplify a process for resuming the apparatus from a state in which the power supply to the control unit of the light source is interrupted.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An optical scanning device comprising:
a light source that emits a laser beam; and
a driving unit connected to the light source and configured to drive the light source;
the driving unit comprising:
a first storage unit that stores in advance therein a setting value for controlling output of the laser beam;
a second storage unit that stores temporally therein the setting value stored in the first storage unit;
a storage controller connected to the first storage unit and the second storage unit; and a voltage detector connected to the storage controller and configured to detect a voltage value supplied to the driving unit, wherein the storage controller, upon the voltage detector detecting that the voltage supply is resumed from a power-off state, transfers the setting value stored in the first storage unit to the second storage unit automatically.

2. The optical scanning device set forth in claim 1, wherein the setting value consists of an adjustment value for adjusting light intensity of the light source.

3. The optical scanning device set forth in claim 1, wherein the setting value consists of a shading correction value.

4. The optical scanning device set forth in claim 1, wherein the first storage consists of a nonvolatile memory.

5. An image forming apparatus comprising the optical scanning device set forth in claim 1.

6. A method for operating an optical scanning device, the optical scanning device including:

a light source that emits a laser beam; and a driving unit connected to the light source and configured to drive the light source;

the driving unit comprising:

a first storage unit that stores in advance therein a setting value for controlling output of the laser beam;

a second storage unit that stores temporally therein the setting value stored in the first storage unit;

a storage controller connected to the first storage unit and the second storage unit; and a voltage detector connected to the storage controller and configured to detect a voltage value supplied to the driving unit, the method comprising:

by the voltage detector, detecting that the voltage supplied to the driving unit is resumed from a power-off state; and by the storage controller, upon the detection, automatically transferring the setting value stored in the first storage unit to the second storage unit.

* * * * *